United States Patent [19]
Harigaya et al.

[11] Patent Number: 5,875,160
[45] Date of Patent: Feb. 23, 1999

[54] METHOD AND DEVICE FOR INITIALIZING OPTICAL RECORDING MEDIUM OF PHASE CHANGE TYPE, AND OPTICAL RECORDING MEDIUM

[75] Inventors: Makoto Harigaya, Hiratsuka; Mikio Kinoshita; Yoshiyuki Kageyama, both of Yokoham, all of Japan

[73] Assignee: Ricoh Company, Ltd., Tokyo, Japan

[21] Appl. No.: 824,205

[22] Filed: Mar. 25, 1997

[30]  Foreign Application Priority Data

Dec. 14, 1996 [JP] Japan ..................................... 8-353108
Jan. 17, 1997 [JP] Japan ..................................... 9-019977

[51] Int. Cl.$^6$ ....................................................... G11B 7/00
[52] U.S. Cl. .......................... 369/44.27; 369/54; 369/112; 369/116
[58] Field of Search ..................................... 369/112, 116, 369/53, 54, 58, 59, 42, 48, 49, 44.27, 44.28

[56]  References Cited

U.S. PATENT DOCUMENTS 5,136,569   8/1992   Fennema et al. ................ 369/44.27 X

FOREIGN PATENT DOCUMENTS 7-52526   6/1995   Japan .

OTHER PUBLICATIONS

"5th Phase Change Recording Study Meeting," 1993, pp. 30–34.

"Laser Study," vol. 18, No. 8, pp. 555–572.

*Primary Examiner*—Muhammad N. Edun
*Attorney, Agent, or Firm*—Dickstein Shapiro Morin & Oshinsky L L P

[57]  ABSTRACT

A device for initializing an optical recording medium includes a semiconductor laser diode, and an optical system which projects a laser beam emitted from the semiconductor laser diode onto the optical recording medium. A half-value width of a spot of the laser beam focused on the optical recording medium is equal to 1/2 to 1/6 times a half-value width of a near-field pattern of the semiconductor laser diode in a direction parallel to a junction interface of the semiconductor laser diode, so that the optical recording medium can be evenly initialized by the laser beam.

19 Claims, 21 Drawing Sheets

FIG. 4

| PRISM MAGNIFICATION | STATE OF BEAM SPOT OF LD1 ON RECORDING MEDIUM IN HORIZONTAL DIRECTION | | INITIALIZED STATE | |
|---|---|---|---|---|
| | HALF-VALUE WIDTH ($\mu m$) | EVENNESS OF INTENSITY PROFILE | VARIATION IN REFLECTION RATIO ON ONE TRACK(%) | UNEVENNESS OF CRYSTALLIZED STATE BY OPTICAL MICROSCOPE |
| 2 | ~100 | × | ±16 | UNEVENNESS OBSERVED |
| 3 | ~65 | △ | ±10 | SLIGHT UNEVENNESS OBSERVED |
| 4 | ~52 | ○ | ±6 | NO UNEVENNESS OBSERVED |
| 5 | ~41 | ○ | ±5 | NO UNEVENNESS OBSERVED |
| 6 | ~33 | ◎ | ±9 | SLIGHT PERIODIC UNEVENNESS OBSERVED |
| 7 | ~27 | ◎ | ±14 | PERIODIC UNEVENNESS OBSERVED |

× : LARGE VARIATION IN INTENSITY PROFILE
△ : SLIGHT VARIATION IN INTENSITY PROFILE
○ : LITTLE VARIATION IN INTENSITY PROFILE AND APPROXIMATELY EVEN
◎ : NO VARIATION IN INTENSITY PROFILE AND EVEN

FIG. 5

| PRISM MAGNIFICATION | JITTER VALUE(ns) AFTER REPETITIVE OVERWRITE | | | |
|---|---|---|---|---|
| | 1 | 2 | 100 | 1000 |
| 2 | 15 | 18 | 12 | 12 |
| 3 | 14 | 16 | 11 | 11 |
| 4 | 13 | 14 | 12 | 12 |
| 5 | 13 | 13 | 12 | 12 |
| 6 | 14 | 14 | 13 | 14 |
| 7 | 15 | 15 | 16 | 18 |

FIG. 6

| PRISM MAGNIFICATION | STATE OF BEAM SPOT OF LD1 ON RECORDING MEDIUM IN HORIZONTAL DIRECTION | | INITIALIZED STATE | |
|---|---|---|---|---|
| | HALF-VALUE WIDTH ($\mu$m) | EVENNESS OF INTENSITY PROFILE | VARIATION IN REFRECTION RATIO ON ONE TRACK(%) | UNEVENNESS OF CRYSTALLIZED STATE BY OPTICAL MICROSCOPE |
| 1 | ~100 | × | ±15 | UNEVENNESS OBSERVED |
| 2 | ~50 | ○ | ±6 | NO UNEVENNESS OBSERVED |
| 3 | ~33 | ◎ | ±9 | SLIGHT PERIODIC UNEVENNESS OBSERVED |
| 4 | ~25 | ◎ | ±15 | PERIODIC UNEVENNESS OBSERVED |

× : LARGE VARIATION IN INTENSITY PROFILE
△ : SLIGHT VARIATION IN INTENSITY PROFILE
○ : LITTLE VARIATION IN INTENSITY PROFILE AND APPROXIMATELY EVEN
◎ : NO VARIATION IN INTENSITY PROFILE AND EVEN

FIG. 7

| PRISM MAGNIFICATION | JITTER VALUE(ns) AFTER REPETITIVE OVERWRITE | | | |
|---|---|---|---|---|
| | 1 | 2 | 100 | 1000 |
| 1 | 16 | 18 | 13 | 12 |
| 2 | 13 | 13 | 12 | 11 |
| 3 | 13 | 14 | 14 | 15 |
| 4 | 16 | 17 | 17 | 19 |

FIG. 8

| POSITION OF FOCUSING POINT (μm) | STATE OF BEAM SPOT OF LD1 ON RECORDING MEDIUM IN HORIZONTAL DIRECTION | | INITIALIZED STATE | |
|---|---|---|---|---|
| | HALF-VALUE WIDTH (μm) | EVENNESS OF INTENSITY PROFILE | VARIATION IN REFLECTION RATIO ON ONE TRACK(%) | UNEVENNESS OF CRYSTALLIZED STATE BY OPTICAL MICROSCOPE |
| −0.5 | ~50 | ○ | ±6 | NO UNEVENNESS OBSERVED |
| −1.0 | ~50 | ○ | ±6 | NO UNEVENNESS OBSERVED |
| −3.0 | ~50 | ○ | ±6 | NO UNEVENNESS OBSERVED |
| −3.5 | ~50 | ○ | ±6 | NO UNEVENNESS OBSERVED |
| +0.5 | ~50 | ○ | ±6 | NO UNEVENNESS OBSERVED |
| +1.0 | ~50 | ○ | ±6 | NO UNEVENNESS OBSERVED |
| +3.0 | ~50 | ○ | ±6 | NO UNEVENNESS OBSERVED |
| +3.5 | ~50 | ○ | ±6 | NO UNEVENNESS OBSERVED |

○ : LITTLE VARIATION IN INTENSITY PROFILE AND APPROXIMATELY EVEN

FIG. 9

| POSITION OF FOCUSING POINT (μm) | JITTER VALUE(ns) AFTER REPETITIVE OVERWRITE | | | |
|---|---|---|---|---|
| | 1 | 2 | 100 | 1000 |
| −0.5 | 13 | 14 | 13 | 13 |
| −1.0 | 12 | 13 | 10 | 9 |
| −3.0 | 12 | 13 | 9 | 8 |
| −3.5 | 14 | 15 | 12 | 11 |
| +0.5 | 13 | 15 | 14 | 13 |
| +1.0 | 13 | 13 | 11 | 10 |
| +3.0 | 13 | 13 | 10 | 9 |
| +3.5 | 15 | 16 | 13 | 12 |

FIG.10

| MOVEMENT OF COLLIMATING LENS(mm) | POWER FOR INITIALIZATION (mW) | STATE OF BEAM SPOT OF LD1 ON RECORDING MEDIUM IN HORIZONTAL DIRECTION ||
|---|---|---|---|
| | | HALF-VALUE WIDTH (μm) | EVENNESS OF INTENSITY PROFILE |
| +0.06 | 900 | — | — |
| | 800 | — | — |
| | 700 | — | — |
| +0.04 | 900 | ~95 | ◎ |
| | 800 | ~93 | ◎ |
| | 700 | — | — |
| +0.02 | 900 | ~98 | — |
| | 800 | ~97 | ◎ |
| | 700 | ~96 | ◎ |
| 0 | 700 | ~100 | × |

× : LARGE VARIATION IN INTENSITY PROFILE
◎ : NO VARIATION IN INTENSITY PROFILE AND EVEN

FIG.11

| MOVEMENT OF COLLIMATING LENS(mm) | POWER FOR INITIALIZATION (mW) | STATE OF BEAM SPOT OF LD1 ON RECORDING MEDIUM IN HORIZONTAL DIRECTION | |
|---|---|---|---|
| | | HALF-VALUE WIDTH ($\mu$m) | EVENNESS OF INTENSITY PROFILE |
| -0.02 | 700 | ~96 | ◎ |
| | 800 | ~97 | ◎ |
| | 900 | ~98 | ○ |
| -0.04 | 700 | - | - |
| | 800 | ~93 | ◎ |
| | 900 | ~95 | ◎ |
| -0.06 | 700 | - | - |
| | 800 | - | - |
| | 900 | - | - |

× : LARGE VARIATION IN INTENSITY PROFILE
△ : SLIGHT VARIATION IN INTENSITY PROFILE
○ : LITTLE VARIATION IN INTENSITY PROFILE AND APPROXIMATELY EVEN
◎ : NO VARIATION IN INTENSITY PROFILE AND EVEN

FIG.12

| MOVEMENT OF COLLIMATING LENS(mm) | POWER FOR INITIALIZATION (mW) | INITIALIZED STATE ||
|---|---|---|---|
| | | VARIATION IN REFLECTION RATIO ON ONE TRACK(%) | UNEVENNESS OF CRYSTALLIZED STATE BY OPTICAL MICROSCOPE |
| +0.06 | 900 | INITIALIZATION IMPOSSIBLE | — |
| | 800 | INITIALIZATION IMPOSSIBLE | — |
| | 700 | INITIALIZATION IMPOSSIBLE | — |
| +0.04 | 900 | ±4 | NO UNEVENNESS |
| | 800 | ±3 | NO UNEVENNESS |
| | 700 | INITIALIZATION IMPOSSIBLE | — |
| +0.02 | 900 | ±8 | SLIGHT UNEVENNESS |
| | 800 | ±5 | NO UNEVENNESS |
| | 700 | ±3 | NO UNEVENNESS |
| 0 | 700 | ±16 | UNEVENNESS |

FIG.13

| MOVEMENT OF COLLIMATING LENS(mm) | POWER FOR INITIALIZATION (mW) | INITIALIZED STATE ||
|---|---|---|---|
| | | VARIATION IN REFLECTION RATIO ON ONE TRACK(%) | UNEVENNESS OF CRYSTALLIZED STATE BY OPTICAL MICROSCOPE |
| -0.02 | 700 | ±4 | NO UNEVENNESS |
| | 800 | ±5 | NO UNEVENNESS |
| | 900 | ±7 | SLIGHT UNEVENNESS |
| -0.04 | 700 | INITIALIZATION IMPOSSIBLE | — |
| | 800 | ±3 | NO UNEVENNESS |
| | 900 | ±5 | NO UNEVENNESS |
| -0.06 | 700 | INITIALIZATION IMPOSSIBLE | — |
| | 800 | INITIALIZATION IMPOSSIBLE | — |
| | 900 | INITIALIZATION IMPOSSIBLE | — |

FIG. 14

| MOVEMENT OF COLLIMATING LENS(mm) | POWER FOR INITIALIZATION (mW) | JITTER VALUE(ns) AFTER REPETITIVE OVERWRITE | | | |
|---|---|---|---|---|---|
| | | 1 | 2 | 100 | 1000 |
| +0.06 | 900 | — | — | — | — |
| | 800 | — | — | — | — |
| | 700 | — | — | — | — |
| +0.04 | 900 | 17 | 19 | 15 | 14 |
| | 800 | 24 | 30 | 21 | 18 |
| | 700 | — | — | — | — |
| +0.02 | 900 | 14 | 15 | 13 | 12 |
| | 800 | 18 | 21 | 16 | 13 |
| | 700 | 22 | 29 | 19 | 17 |
| 0 | 700 | 15 | 18 | 12 | 12 |

FIG.15

| MOVEMENT OF COLLIMATING LENS(mm) | POWER FOR INITIALIZATION (mW) | JITTER VALUE(ns) AFTER REPETITIVE OVERWRITE | | | |
|---|---|---|---|---|---|
| | | 1 | 2 | 100 | 1000 |
| −0.02 | 700 | 22 | 27 | 18 | 15 |
| | 800 | 17 | 21 | 15 | 13 |
| | 900 | 13 | 14 | 11 | 11 |
| −0.04 | 700 | − | − | − | − |
| | 800 | 23 | 28 | 19 | 17 |
| | 900 | 16 | 17 | 14 | 12 |
| −0.06 | 700 | − | − | − | − |
| | 800 | − | − | − | − |
| | 900 | − | − | − | − |

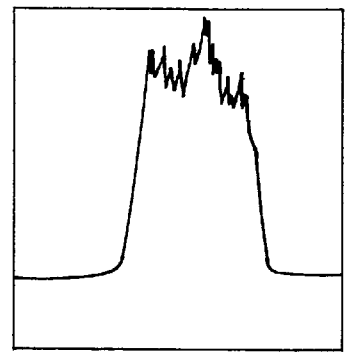
F I G . 16A
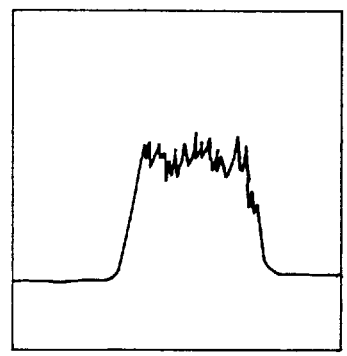
F I G . 16B
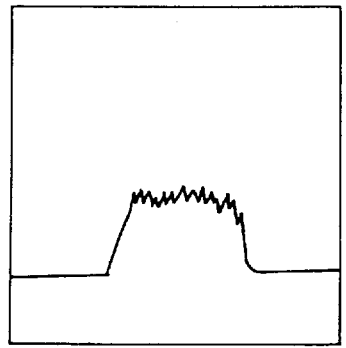
F I G . 16C

FIG. 22

| NEAR-FIELD PATTERN IN HORIZONTAL LATERAL MODE | TRANSPORTING VELOCITY FOR INITIALIZATION ($\mu m/r$) | EVALUATION | | | |
|---|---|---|---|---|---|
| | | VARIATION IN REFLECTION RATIO ON ONE TRACK AFTER INITIALIZATION (±%) | STATE AFTER INITIALIZATION OBSERVED MICROSCOPE | JITTER VALUE (ns) AFTER REPETITIVE OVERWRITE | |
| | | | | 1 | 1000 |
| EXAMPLE #5 | 20 | 3.1 | NO UNEVENNESS | 8.1 | 10.2 |
| | 30 | 3.4 | NO UNEVENNESS | 8.4 | 10.5 |
| | 40 | 4.1 | NO UNEVENNESS | 8.7 | 10.5 |
| COMPARE | 20 | 15.5 | UNEVENNESS | 9.1 | 11.0 |
| | 30 | 16.4 | UNEVENNESS | 9.8 | 12.1 |
| | 30 | 17.3 | UNEVENNESS | 10.3 | 12.7 |

FIG.23

| LD No. | EVENNESS (±%) | CHARACTERISTICS ||||
|---|---|---|---|---|---|
| | | VARIATION IN REFLECTION RATIO ON ONE TRACK AFTER INITIALIZATION (±%) | STATE AFTER INITIALIZATION OBSERVED MICROSCOPE | JITTER VALUE (ns) AFTER REPETITIVE OVERWRITE ||
| | | | | 1 | 1000 |
| 1 | 3 | 3.1 | NO UNEVENNESS OBSERVED | 8.6 | 10.7 |
| 2 | 6 | 4.3 | NO UNEVENNESS OBSERVED | 8.6 | 10.8 |
| 3 | 9 | 6.3 | NO UNEVENNESS OBSERVED | 8.7 | 10.9 |
| 4 | 12 | 9.2 | SLIGHT UNEVENNESS OBSERVED | 8.9 | 10.9 |
| 5 | 15 | 14.8 | UNEVENNESS OBSERVED | 9.5 | 11.7 |
| 6 | 20 | 16.4 | UNEVENNESS OBSERVED | 9.8 | 12.1 |

FIG. 24

| HORIZONTAL LATERAL MODE ON RECORDING MEDIUM | TRANSPORTING VELOUTY FOR INITIALIZATION (μm/r) | EVALUATION | | | |
|---|---|---|---|---|---|
| | | VARIATION IN REFLECTION RATIO ON ONE TRACK AFTER INITIALIZATION (±%) | STATE AFTER INITIALIZATION OBSERVED MICROSCOPE | JITTER VALUE (ns) AFTER REPETITIVE OVERWRITE | |
| | | | | 1 | 1000 |
| | 20 | 5.1 | NO UNEVENNESS | 8.8 | 11.2 |
| | 30 | 5.4 | NO UNEVENNESS | 8.8 | 11.3 |
| ∿∿∿ | 30 | 5.9 | NO UNEVENNESS | 8.9 | 11.4 |

METHOD AND DEVICE FOR INITIALIZING OPTICAL RECORDING MEDIUM OF PHASE CHANGE TYPE, AND OPTICAL RECORDING MEDIUM

BACKGROUND OF THE INVENTION

1. Field of the Invention

The present invention generally relates to a method and device for initializing an optical recording medium of a phase-change type.

2. Description of the Related Art

An optical recording medium, particularly an optical recording medium of a phase change type has an initial state (erased state) of a crystal phase. Generally, a recording layer has an amorphous phase after it is grown to a film. Hence, it is necessary to crystallize the grown film of the recording layer. This is an initializing step.

It is required that the initializing step initialize the grown film so that it is uniform, that is, so that the film has little variation in the reflection radio. It is also required to initialize the film as fast as possible.

In order to satisfy the above requirements, it has been proposed to utilize a high-power semiconductor laser diode of a broad-area type (see 5th Phase Change Recording Study Meeting, 1993, pp. 30). This paper proposes a method of projecting a hyperelliptic laser beam spot of 1 $\mu$m to 100 $\mu$m onto a disk to be initialized so that the beam is orthogonal to tracks formed on the disk. This method can initialize tens of tracks at one time.

Japanese Unexamined Patent Publication No. 7-52526 discloses that a light is split into two beams of an identical wavelength. The two beams are superimposed so as to form interference fringes, which are used to initialize the disk. Hence, it is possible to prevent a micro crack from being formed in a heat-resistance layer, so that the repetitive recording performance of the disk can be improved.

However, the above two conventional methods do not make the recording layer have an even reflection ratio. The method proposed in the former paper utilizes the high-power semiconductor laser diode of the broad-area type as a light source for initialization. Hence, as shown in "Laser Study", vol. 18, No. 8, pp. 555–pp. 572, a near-field pattern parallel to the junction interface of the laser (horizontal lateral mode) is trapezoidal, so that the intensity profile is not uniform inherently. The method of the latter paper utilizes the interference fringes, and it is thus impossible to inherently avoid unevenness of the reflection ratio.

SUMMARY OF THE INVENTION

It is an object of the present invention to provide a method and device for initializing an optical recording medium having little variation in the reflection ratio thereof.

Another object of the present invention is to provide an optical recording medium having an improved initialized state.

The above objects of the present invention are achieved by a device for initializing an optical recording medium comprising: a semiconductor laser diode; and an optical system which projects a laser beam emitted from the semiconductor laser diode onto the optical recording medium, a half-value width of a spot of the laser beam focused on the optical recording medium being equal to ½ to ⅙ times a half-value width of a near-field pattern of the semiconductor laser diode in a direction parallel to a junction interface of the semiconductor laser diode, so that the optical recording medium can be evenly initialized by the laser beam.

The device may be configured so that: the semiconductor laser diode has a stripe width of approximately 200 $\mu$m; and the half-value width of the spot of the laser beam focused on the optical recording medium is equal to ⅓ to ⅙ times the half-value width of the near-field pattern of the semiconductor laser diode in the direction parallel to the junction interface of the semiconductor laser diode.

The device may be configured so that: the semiconductor laser diode has a stripe width of approximately 100 $\mu$m; and the half-value width of the spot of the laser beam focused on the optical recording medium is equal to ½ to ⅓ times the half-value width of the near-field pattern of the semiconductor laser diode in the direction parallel to the junction interface of the semiconductor laser diode.

The device may be configured so that the optical system comprises: a collimating lens collimating the laser beam emitted from the semiconductor laser diode; an anamorphotic optical system enlarging a collimated beam from the collimating lens only in the direction parallel to the junction interface of the semiconductor laser diode; and an objective lens focusing an enlarged beam from the anamorphotic optical system on the optical recording medium.

The above objects of the present invention are also achieved by a device for initializing an optical recording medium comprising: a semiconductor laser diode; and an optical system which projects a laser beam emitted from the semiconductor laser diode onto the optical recording medium, the optical system including an adjustment part which adjusts a position of a focusing point of the laser beam with respect to the optical recording medium, the adjustment part adjusting the position of the focusing point of the laser beam so that the focusing point is located out of a recording layer of the optical recording medium, so that the recording layer can be evenly initialized by the laser beam.

The device may be configured so that the adjustment part adjusts the position of the focusing point of the laser beam so as to be located within a distance of 1 $\mu$m to 3 $\mu$m at either side of the recording layer of the optical recording medium.

The device may further comprise a monitor part which monitors a shape of the laser beam on the optical recording medium and an intensity profile thereof.

The above objects of the present invention are also achieved by a device for initializing an optical recording medium comprising: a semiconductor laser diode; and an optical system which projects a laser beam emitted from the semiconductor laser diode onto the optical recording medium, the laser beam having a degree of evenness of an intensity profile in a direction parallel to a junction interface of the semiconductor laser diode satisfying a given condition which enables a recording layer of the optical recording medium to be evenly initialized.

The device may be configured so that: the degree of evenness of the intensity profile of the laser beam is defined as:

$$Ft(\%)=2(PH-PL)/(PH+PL)\times100(\%)$$

where PH denotes a lower-end amplitude of the laser beam, PL denotes an upper-end amplitude thereof, and Ft denotes the degree of evenness of the intensity profile of the laser beam; and the degree Ft falls within a range of ±10%.

The device may be configured so that the degree Ft falls within a range of ±10% on the recording layer of the optical recording medium.

The device may be configured so that the laser beam has an intensity profile having a periodic wave portion in which the intensity of the laser beam has a periodical change in the direction parallel to the junction interface of the semiconductor laser diode.

The above objects of the present invention are also achieved by a method for initializing an optical recording medium comprising the step of: (a) projecting a laser beam emitted from a semiconductor laser diode onto the optical recording medium so that a half-value width of a spot of the laser beam focused on the optical recording medium is equal to ½ to ⅙ times a half-value width of a near-field pattern of the semiconductor laser diode in a direction parallel to a junction interface of the semiconductor laser diode, whereby the optical recording medium can be evenly initialized by the laser beam.

The above objects of the present invention are also achieved by a method for initializing an optical recording medium comprising the step of: (a) projecting a laser beam emitted from a semiconductor laser diode onto the optical recording medium so that a position of a focusing point of the laser beam is located out of a recording layer of the optical recording medium, whereby the recording layer can be evenly initialized by the laser beam.

The method may be configured so that the step (a) comprises the step of adjusting the position of the focusing point of the laser beam so as to be located within a distance of 1 μm to 3 μm at either side of the recording layer of the optical recording medium.

The above objects of the present invention are also achieved by a method for initializing an optical recording medium comprising the step of: (a) projecting a laser beam emitted from a semiconductor laser diode onto the optical recording medium so that a degree of evenness of an intensity profile of the laser beam in a direction parallel to a junction interface of the semiconductor laser diode satisfies a given condition which enables a recording layer of the optical recording medium to be evenly initialized.

The method may be configured so that: the degree of evenness of the intensity profile of the laser beam is defined as:

$$Ft(\%) = 2(PH-PL)/(PH+PL) \times 100(\%)$$

where PH denotes a lower-end amplitude of the laser beam, PL denotes an upper-end amplitude thereof, and Ft denotes the degree of evenness of the intensity profile of the laser beam; and the degree Ft falls within a range of ±10%.

The above objects of the present invention are achieved by an optical recording medium comprising: a base layer; a first protection layer formed on the base layer; a recording layer formed on the first protection layer; and a second protection layer, the recording layer having an initialized state obtained by projecting a laser beam emitted from a semiconductor laser diode onto the optical recording medium so that a half-value width of a spot of the laser beam focused on the optical recording medium is equal to ½ to ⅙ times a half-value width of a near-field pattern of the semiconductor laser diode in a direction parallel to a junction interface of the semiconductor laser diode, whereby the optical recording medium can be evenly initialized by the laser beam.

The above objects of the present invention are also achieved by an optical recording medium comprising: a base layer; a first protection layer formed on the base layer; a recording layer formed on the first protection layer; and a second protection layer, the recording layer having an initialized state obtained by projecting a laser beam emitted from a semiconductor laser diode onto the optical recording medium so that a position of a focusing point of the laser beam is located out of a recording layer of the optical recording medium, whereby the recording layer can be evenly initialized by the laser beam.

The above objects of the present invention are also achieved by an optical recording medium comprising: a base layer; a first protection layer formed on the base layer; a recording layer formed on the first protection layer; and a second protection layer, the recording layer having an initialized state obtained by projecting a laser beam emitted from a semiconductor laser diode onto the optical recording medium so that a degree of evenness of an intensity profile of the laser beam in a direction parallel to a junction interface of the semiconductor laser diode satisfies a given condition which enables a recording layer of the optical recording medium to be evenly initialized.

BRIEF DESCRIPTION OF THE DRAWINGS

Other objects, features and advantages of the present invention will become apparent from the following detailed description when read in conjunction with the accompanying drawings, in which:

FIGS. 4, 5, 6 and 7 are respectively diagrams showing experimental results obtained by using optical recording media initialized according to the first embodiment of the present invention;

FIGS. 8, 9, 10, 11, 12, 13, 14 and 15 are respectively diagrams showing experimental results obtained by using optical recording media initialized according to the second embodiment of the present invention;

FIGS. 16A, 16B and 16C are diagrams showing a relationship between the intensity of light projected onto an optical recording medium and movement of a collimating lens used in the second embodiment of the present invention;

FIGS. 22, 23 and 24 are respectively diagrams showing experimental results obtained by using optical recording media initialized by the third embodiment of the present invention.

DETAILED DESCRIPTION

A description will be given of first and second embodiments of the present invention, which can be summarized as follows. According to the first embodiment of the present invention, an anamorphotic optical system such as an anamorphotic prism pair is used to project a reduced-size spot on a disk to be recorded in a direction parallel to the junction interface of a high-power semiconductor laser diode, so that the beam profile is made uniform in the above direction, whereby an initial state having little variation in the reflection ratio thereof can be realized. According to the second embodiment of the present invention, the laser beam emitted from the high-power semiconductor laser diode is projected, without the anamorphotic optical system, onto the disk so that the beam is in an out-of-focus state on the disk (that is, the beam is not focused perfectly thereon). Hence, the beam intensity profile in the direction parallel to the junction interface of the laser diode is not definite on the disk. This offset focusing of the beam functions to make the disk have little variation in the reflection ratio. As will be described in detail later, the focal point of the beam is shifted within a range of 1 $\mu$m to 3 $\mu$m upwards and downwards from a recording layer of the optical disk. This realizes a fine crystal state of the recording layer.

Figure 1:
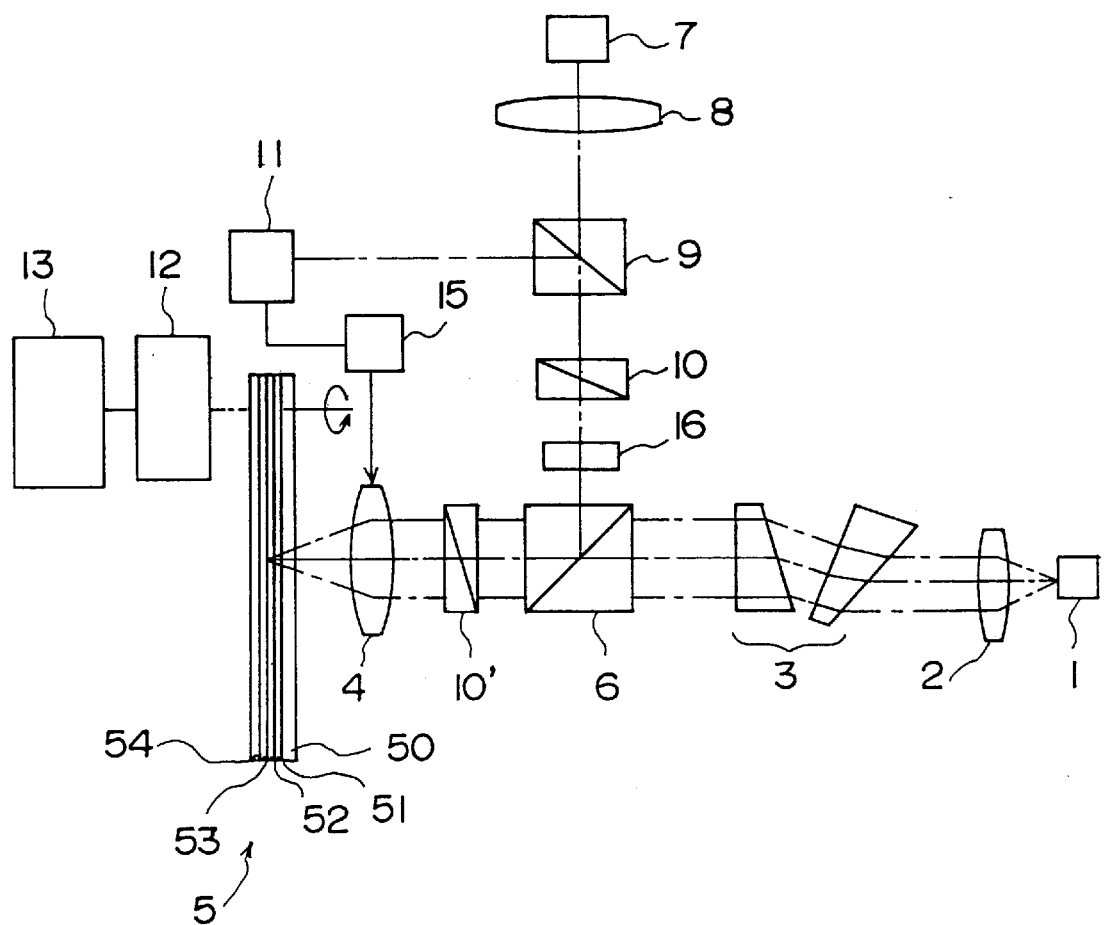
FIG. 1 is a diagram of a device for initializing an optical recording medium according to a first embodiment of the present invention.

FIG. 1 shows a device for initializing an optical recording medium (disk) 5 according to the first embodiment of the present invention. The optical recording medium 5 is supported by a rotating mechanism 12 so that it is rotatable around the central axis of the rotating mechanism 12. The rotating mechanism 12 employs a CLV (Constant Linear Velocity) system, in which the rotating mechanism 12 rotates the medium 5 so that the linear velocity of a portion of the medium 5 onto which the beam spot is projected is constant. The rotating mechanism 12 is transported in the radial direction of the medium 5 (up and down directions on the drawing sheet) together with the medium 5 by means of a transporting mechanism 13. It is also possible to use a mechanism which moves an optical system including a source for initialization.

The optical recording medium 5 has a polycarbonate base plate 50, on which a lower protection layer 51 made of ZnS—SiO$_2$ is formed to a thickness of 2000 Å. On the layer 51 is formed a recording layer 52 of Ag—In—Sb—Te to a thickness of 200 Å. An upper protection layer 53 made of ZnS—SiO$_2$ is formed to a thickness of 250 Å. A reflection layer 54 formed of an Al alloy layer is formed on the upper protection layer 53 so as to have a thickness of 1000 Å. The recording layer 52 is initialized by the laser beam projected from the side of the polycarbonate base plate 50.

A high-power semiconductor laser diode 1 has a stripe width of 100 $\mu$m or 200 $\mu$m and a power of 1 W. The laser diode 1 is arranged so that the direction parallel to the junction interface of the active layer of the laser diode 1 is parallel to the direction orthogonal to tracks of the recording medium 5 to be initialized.

Figure 2:
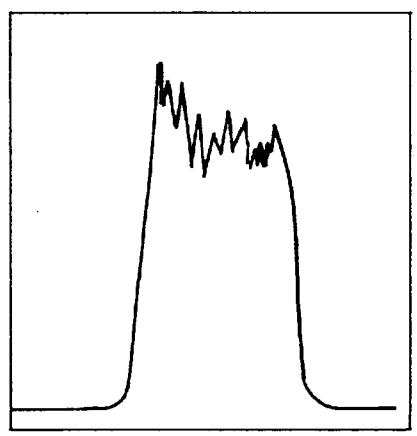
FIG. 2 is a graph showing an intensity profile of a semiconductor laser diode.

FIG. 2 shows a graph of a near-field pattern in the direction parallel to the junction interface of the laser diode 1. It can be seen from the graph of FIG. 2 that the intensity profile of the laser diode 1 is trapezoidal and uneven. This causes an unevenness of the reflection ratio during the initializing process.

Turning to FIG. 1 again, a collimating lens 2 collimates the laser beam from the laser diode 1. A pair of anamorphotic prisms 3 serves as an anamorphotic optical system. The prisms 3 have the function of refracting the beam only in the direction parallel to the longitudinal direction (up and down directions in FIG. 1) of the active layer of the laser diode 1. As shown in FIG. 1, the prisms 3 enlarges the size of the laser beam only in the direction parallel to the active layer of the laser diode 1. The enlarged laser beam passes through a quarter wavelength plate 10' and is focused on the recording layer 52 of the recording medium 5 by an objective lens 4. The spot size of the laser beam obtained on the recording layer 52 depends on the focal distances of the collimating lens 2 and the objective lens 4 and the magnification ratio of the pair of anamorphotic prisms 3. According to the present invention, the spot size of the laser beam obtained on the recording layer 52 is set equal to ½–⅙ times the half-value width of the near-field pattern parallel to the junction interface of the laser diode 1.

It should be noted that the above size of the beam spot is measured in the direction parallel to the junction interface of the laser diode 1. Although the intensity profile of the beam spot has a trapezoidal shape, it is uniform due to the spot size equal to ½–⅙ times he half-wave width of the near-field pattern parallel to the junction interface of the laser diode 1. In other words, the half-value width of the trapezoidal intensity profile is reduced and thus the intensity profile becomes even, so that the intensity profile can be made even substantially. Hence, the recording layer 52 is made to have a uniform reflection ratio.

When the laser diode 1 having the stripe width equal to 200 $\mu$m is used, the half-value width of the beam on the recording layer 52 in the horizontal direction is preferably set equal to ⅓ to ⅙ times the half-value width of the near-field pattern in the horizontal direction, and is more preferably set equal to ¼ to ⅕ times. When the laser diode 1 having the stripe width equal to 100 $\mu$m is used, the half-value width of the beam on the recording layer 52 in the horizontal direction is preferably set equal to ½ to ⅓ times the half-value width of the near-field pattern in the horizontal direction, and is more preferably set to approximately ½ times. The above range of the beam spot makes it possible to effectively and efficiently make the recording layer 52 have a uniform reflection ratio during a reduced initializing time.

A beam splitter 6 is provided as shown in FIG. 1. A focusing mechanism includes a low power semiconductor laser diode 7, which can be operated independently of the laser diode 1. The independent use of the laser diode 7 is intended to efficiently utilizing the power of the laser diode 1 and arbitrarily control the spot shape of the beam and focused state thereof on the recording medium 5. A collimating lens 8 collimates the laser beam emitted from the laser diode 7. A polarized beam splitter 9 splits the beam into two beams. The beam passing through the beam splitter 9 passes through a half wavelength plate 10 and a wavelength filter 16, and enters the beam splitter 6. The other beam passing through the beam splitter 9 is applied to a focus signal generating element 11, an output signal of which element is applied an actuator 15 which drives the objective lens 4.

The actuator 15 moves the objective lens 4 along the optical axis so that the focus signal indicates zero and the collimated beam is focused on the reflection layer 54. At this time, the laser beam emitted from the laser diode 1 is focused on the recording layer 52. The focus signal generating element 11 can be made of an astigmatism generating optical element and a four-division photodetector when the focusing operation employs an astigmatism method, and can be made of a focusing lens, a knife edge, and a two-division photodetector when the focusing operation employs a knife-edge method. The wavelength filter 16 is used to prevent the light emitted from the laser diode 1 from returning to the focus servo system.

The initializing process is carried out in the high power laser beam emitted from the laser diode 1 is focused on the recording layer 52 while the recording medium 5 is rotated by the rotating mechanism 12, and simultaneously the recording medium 5 is transported in the radial direction thereof (the direction orthogonal to the tracks) at a constant velocity by means of the transporting mechanism 13.

Figure 3:
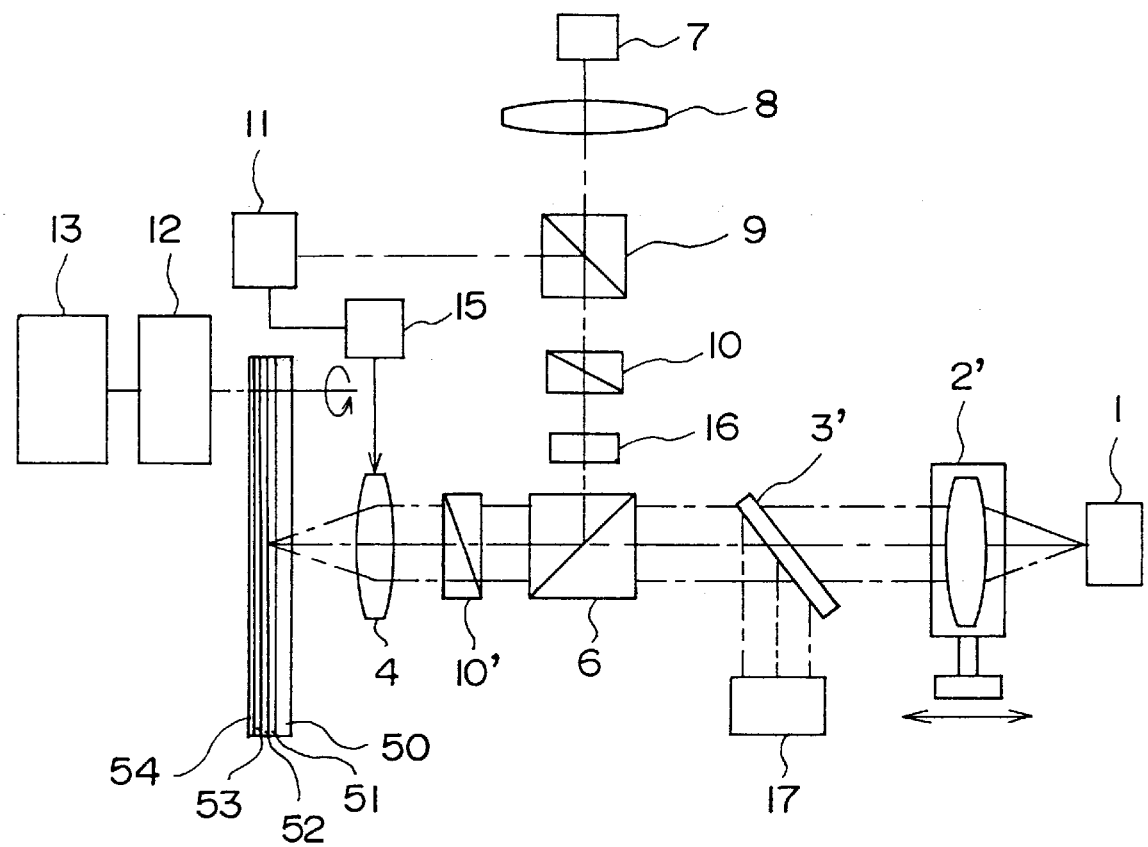
FIG. 3 is a diagram of a device for initializing an optical recording medium according to a second embodiment of the present invention.

FIG. 3 is a block diagram of a device for initializing the recording medium 5 according to the second embodiment of the present invention. In FIG. 3, parts that are the same as those shown in FIG. 1 are given the same reference numbers. The device shown in FIG. 3 does not employ the pair of anamorphotic prisms 3 used in FIG. 1. The collimating lens 2 shown in FIG. 1 is indicated by a reference number 2' in FIG. 3, which can be moved in the directions indicated by the arrow shown in FIG. 3. The position of the focusing point of the beam emitted from the laser diode 1 can be adjusted in the direction perpendicular to the recording medium 5, which is subjected to the focus servo control by utilizing the beam emitted from the laser diode 7. If the optical system of the laser diode 1 is adjusted so that the focusing point thereof is not on the recording layer 52, the intensity profile of the beam emitted from the laser diode 1 in the direction parallel to the junction interface of the laser diode 1 is not definite on the recording medium 5. The uneven intensity profile of the indefinite spot of the beam from the laser diode 1 is not critical on the recording layer 52, so that the recording layer 52 can be evenly initialized.

A 99% transparent mirror 3' functions to enter the beam emitted from the laser diode 1 and reflected by the reflection layer 54 of the recording medium 5 into a CCD camera 17. The CCD camera 17 is used to observe the size (shape) of the spot of the beam emitted from the laser diode 1 and the intensity profile thereof, particularly observed in the direction parallel to the junction interface of the laser diode 1. While watching an image taken by the CCD camera 17, the position of the collimating lens 2' is adjusted so that the out-of-focused intensity profile can be observed on the recording layer 52, which cannot be substantially affected by the unevenness of the intensity profile. Hence, the recording layer 52 has a substantially even reflection ratio, and the recording medium 5 has an improved quality.

It should be noted that the CCD camera 7 can be applied to the anamorphotic optical system of the device shown in FIG. 1.

A description will now be given of concrete examples obtained in the following experiments.

(1) EXAMPLE #1

The laser diode 1 was used which has a stripe width of 200 $\mu$m and a power of 1 W. The collimating lens 2 was used which has a focal distance of 4 mm and a numerical aperture (NA) of 0.5. The objective lens 4 was used which has a focal distance of 4 mm and an NA of 0.5. These optical elements were made stationary. The magnification of the pair of anamorphotic prisms 3 was changed to 2, 3, 4, 5, 6 and 7 times. At respective magnifications, the recording medium 5 was initialized. In the initialization process, the linear velocity by the rotation of the recording medium 5 was 4 m/s, and the transport velocity (which is the amount of movement of the recording medium 5 by the transporting mechanism 13 per revolution) was 30 $\mu$m/r. The power of the laser diode 1 was set equal to 700 mW.

The recording media 5 were evaluated by observing a variation in the reflection ratio of one track (one round) on each medium and observing the states of the media 5 by an optical microscope after the recording media 5 were initialized. The CCD 17 camera was used to observe, on the recording media 5, the half-value width and intensity profile of the beam emitted from the laser diode 1 parallel to the junction interface thereof. An EFM random pattern was used as a recording signal and was repeatedly overwritten into the initialized recording media 5. In the overwriting operation, the recording power was 13 mW, the bias power was 5 mW, and the recording linear velocity was 2.8 m/s. The recording media 5 thus subjected to the overwriting operation were evaluated by using a jitter of a 3T signal (intermark) respectively obtained when the overwriting process was repeatedly carried out 1 time, 2 times, 100 times and 1000 times.

The layer structure of each recording medium 5 was as follows and formed by sputtering:
 base 50: polycarbonate base
 lower protection layer 51: ZnS—SiO$_2$, 2000 Å thick
 recording layer 52: Ag—In—Sb—Te, 200 Å thick
 upper protection layer 53: ZnS—SiO$_2$, 250 Å thick
 reflection layer 54: Al alloy, 1000 Å thick The laser beam emitted from the laser diode 1 was projected onto the recording layer 52 of each recording medium 5 from the side of the polycarbonate base 50 thereof.

The experimental results of example #1 are shown in FIGS. 4 and 5. It can be seen from FIGS. 4 and 5 that good results can be obtained by setting the magnification of the pair of anamorphotic prisms 3 equal to 3 through 6 times, particularly 4 times or 5 times. The half-value widths of the beam spot in the horizontal direction on the disks obtained when the magnification of the pair of anamorphotic prisms 3 was set equal to 3, 4, 5 and 6 times are approximately equal to than 67 $\mu$m, 50 $\mu$m, 40 $\mu$m and 33 $\mu$m. It should be noted that the half-value width of the near-field pattern of the laser diode 1 in the horizontal direction is approximately equal to 200 $\mu$m. Hence, the half-value widths of the beam spot are $1/3$, $1/4$, $1/5$ and $1/6$ times the half-value width of the near-field pattern of the laser diode 1. Hence, a reduction in the beam spot size functions to make the intensity profile even and make the recording layer 52 have a constant reflection ratio.

When the pair of anamorphotic prisms 3 is used, the even intensity profile can be obtained, while the beam spot size is less than the transport speed of 30 $\mu$m. Hence, in this case, a periodic unevenness in the crystallized state of the recording medium (layer) was observed by the optical microscope. It is possible to eliminate the periodic unevenness by setting the transport velocity to less than 30 $\mu$m/s, although it will take a longer time to complete the initialization process. With the above in mind, in the case where the high power laser diode 1 is used, it is preferable to set the half-value width of the beam spot on the recording layer 52 in the horizontal direction approximately equal to 33 $\mu$m to 65 $\mu$m, that is, equal to $1/3$ to $1/6$ times the half-value width of the near-field pattern of the laser diode 1 in the horizontal direction. It is more preferable to set the half-value width of the beam spot on the recording layer 52 in the horizontal direction equal to $1/4$ to $1/5$ times the half-value width of the near-field pattern of the laser diode 1 in the horizontal direction. The jitter magnitudes obtained in the above case are good.

When the pair of anamorphotic prisms 3 having a magnification of 2 times is used, the beam spot on the recording medium in the horizontal direction is as long as approximately 100 $\mu$m, and thus the intensity profile of the beam is uneven. Thus, the reflection ratio of the recording media after the initialization varies within a large range.

(2) EXAMPLE #2

The laser diode 1 was used which has a stripe width of 100 $\mu$m and a power of 1 W. The collimating lens 2 was used which has a focal distance of 4 mm and an NA of 0.5. The objective lens 4 was used which has the same focal distance and NA as those of the collimating lens 2. The magnification of the pair of anamorphotic prisms 3 was changed to 2, 3 and 4 times. The other conditions were the same as those in example #1. The same evaluation method as that for example #1 was used.

The experimental results in example #2 are shown in FIGS. 6 and 7. It can be seen from FIGS. 6 and 7 that an even intensity profile can be obtained when the magnification of the pair of anamorphotic prisms 3 is set equal to 2 or 3 times. In this case, the half-value width of the beam spot on the recording media in the horizontal direction is approximately equal to 50 $\mu$m or 33 $\mu$m, which respectively corresponds to ½ or ⅓ times the half-value width (about 100 $\mu$m) of the near-field pattern of the laser diode 1 in the horizontal direction. That is, a reduction in the beam spot size functions to make the intensity profile even and make the recording layer 52 have a constant reflection ratio. The excellent result can be obtained when the half-value width of the beam spot is set equal to ½ times that of the near-field pattern of the laser diode 1.

When the pair of anamorphotic prisms 3 having a magnification of 4 times is used, an even intensity profile can be obtained on the recording medium 5 in the horizontal direction, whereas a periodic unevenness of the crystallized state may be observed due to the condition in which the half-value width of 25 $\mu$m is less than the transport velocity of 30 $\mu$m/r in the initializing process. If the transport velocity is set equal to or less than about 20 $\mu$m/r, the periodic unevenness will be eliminated. However, it will take a longer time to complete the initialization process. When the pair of anamorphotic prisms 3 is not used (which is equivalent to a case where a pair of anamorphotic prisms having a magnification of 1 times is used), the half-value width of the beam spot on the recording medium in the horizontal direction is approximately 100 $\mu$m. Hence, the intensity profile of the near-field pattern of the laser diode 1 in the horizontal direction is directly reflected on the recording media. In this case, a large unevenness of the reflection ratio of the recording layer will occur after the initialization. The jitter performance shown in FIG. 7 is good in any magnification.

(3) EXAMPLE #3

The laser diode 1 was used which has a stripe width of 200 $\mu$m and a power of 1 W. The prism having a magnification of 4 times was used to adjust the optical system so that the focusing point is located at upper and lower positions equal to ±0.5 $\mu$m, ±1.0 $\mu$m, ±3.0 $\mu$m and ±3.5 $\mu$m with respect to the recording layer 52. In this case, the sign "+" indicates the upper side of the recording 52 (on which side the reflecting layer 54 is provided), and the sign "−" indicates the lower side thereof (on which side the base 50 is provided). The size of the focused beam spot corresponds to a half-value width of approximately 50 $\mu$m and is equal to ¼ times the half-value width of the near-field pattern of the laser diode 1 in the horizontal direction. The linear velocity during the initialization process was 4 m/s, the transport velocity was 30 $\mu$m/r, and the power of the laser diode 1 was 860 mW. The recording method and evaluation method for the recording media 5 were the same as those for example #1.

FIGS. 8 and 9 show the experimental results of example #3. It can be seen from FIGS. 8 and 9 that the initialized states of the samples are good. However, the following can be seen from FIGS. 8 and 9. When the position of the focusing point is located at ±0.5 $\mu$m, a large jitter magnitude is observed after the overwriting process is repeatedly carried out. When the position of the focusing point is located at ±3.5 $\mu$m, a large jitter magnitude is observed even after the overwriting process is carried out once. On the other hand, when the position of the focusing point is located at ±1.0 $\mu$m or ±3.0 $\mu$m, a small jitter magnitude is observed irrespective of the number of times that the overwriting process is repeatedly carried out. Although not shown, in a case where the half-value width of the spot of the beam emitted from the laser diode 1 observed on the recording medium is equal to ⅓, 1/5 or ⅙ times the half-value width of the near-field pattern, good initialization results are obtained if the position of the focusing point falls in the upper range of +1 $\mu$m to +3 $\mu$m or the lower range of −1 $\mu$m to −3 $\mu$m.

(4) EXAMPLE #4

This relates to the second embodiment of the present invention. The laser diode 1 was used which has a stripe width of 200 $\mu$m and a power of 1 W. The collimating lens 2' was used which has a focal distance of 8 mm and an NA of 0.5. The objective lens 4 was used which has a focal distance of 4 mm and an NA of 0.5. As has been described, the collimating lens 2' can be moved along the optical axis, and the position of the focusing point can be adjusted along the optical axis with respect to the recording layer 52. The focusing servo using the low power laser diode 7 is carried out. Hence, the intensity of the beam in the horizontal direction on the recording medium 5 can be made indefinite at a given ratio to the focusing point of the laser beam emitted from the laser diode 1 on the recording medium 5.

In example #4, the sign "+" is added to the amount of movement of the collimating lens 2' with respect to the position of the collimating lens 2' on which the focal point is located when the collimating lens 2' is moved closer to the laser diode 1. The sign "−" is added to the amount of movement when the collimating lens 2' is moved further from the laser diode 1. The amount of movement was measured by monitoring, on the recording medium 5 by means of the CCD camera 17, the intensity profile of the beam emitted from the laser diode 1 in the horizontal direction.

In the initializing process, the linear velocity was 4 m/s, and the transport velocity is 30 $\mu$m/r. The laser power in the initializing process was set equal to 700 mW, 800 mW and 900 mW for the respective amounts of movement of the collimating lens 2'. The structure of the recording media 5 used in example #4 was the same as that of example #1. The method for evaluating the recording media 5 in example #4 was the same as that for those in example #1.

FIGS. 10 through 15 show the experimental results of example #4. FIG. 16A shows an intensity profile of the 900 mW beam observed when the beam was focused on the recording layer 52. FIG. 16B shows an intensity profile of the 900 mW beam observed when the collimating lens 2' was moved by +0.02 mm. FIG. 16C shows an intensity profile of 900 mW beam observed when the collimating lens 2' was moved by +0.04 mW.

In example #4, the position of the collimating lens 2' obtained when the beam emitted from the laser diode 1 is focused on the recording layer 52 is the reference position in the initializing process. When the collimating lens 2' is moved in the horizontal direction by 0.02 mm, 0.04 mm and 0.06 mm so as to be moved closer to the laser diode 1 or be moved away therefrom, the focusing point of the beam is located out of the recording layer 52, and the intensity profile becomes indefinite thereon and lower. When the collimating lens 2' is moved by 0.06 mm, the recording layer 52 cannot be initialized. When the collimating lens 2' is moved by 0.04 mm, the intensity profiles obtained when the power of the laser diode 1 is equal to 800 mW or 900 mW is made indefinite on the recording layer 52 and becomes substantially even thereon. Hence, the variations in the reflection ratio of the recording media 5 in the initialized state are as excellent as ±3%–±5%. It can be seen from the above that the initialization process carried out in the laser beam offset state (out-of-focus state) is very effective.

It should be appreciated that the laser diode 7 for the focus servo control is provided independently of the laser diode 1 and the collimating lens 2' can be moved with respect to the laser diode 1. The jitter observed when overwriting the recording medium 5 is large when the collimating lens 2' is moved by a distance as large as 700 mW. This is because the focusing point is out of the recording layer 52 and the power is thus reduced. It can be considered that the occurrence of such a large jitter means that the recording layer 52 is not completely initialized due to a shortage of power. When the collimating lens 2' is moved by 0.02 mm, the variation in the reflection ratio after the initialization process is not large, and the jitter performance is improved, as compared with that obtained when the beam is focused. The above shows that the out-of-focus projection of the beam is effective. The degree of the offset from the focused state to perform the initialization process well can be roughly determined by the CCD camera 17.

A description will now be given of a third embodiment of the present invention.

Figure 17:
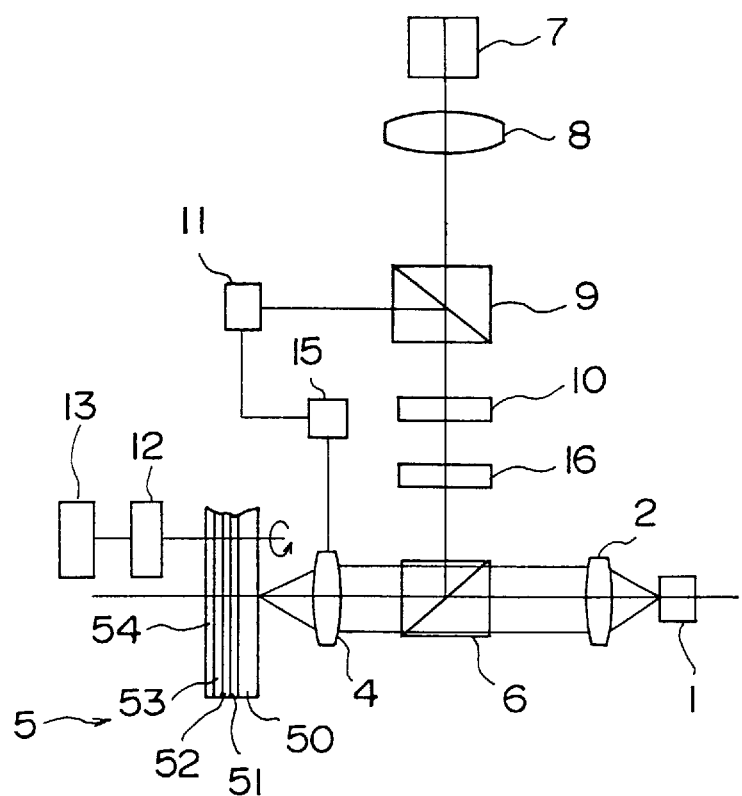
FIG. 17 is a diagram of a device for initializing an optical recording medium according to a third embodiment of the present invention.

FIG. 17 is a diagram of a device for initializing the optical recording medium (disk) 5 according to the third embodiment of the present invention. In FIG. 17, parts that are the same as those in previously described figures are given the same reference numbers. The device shown in FIG. 17 does not employ the pair of anamorphotic prisms 3 used in the first embodiment of the present invention. The third embodiment of the present invention is directed to defining some parameters of the laser diode 1 in order to effectively and efficiently initialize the recording layer 52 of the recording medium 5.

Figure 18:
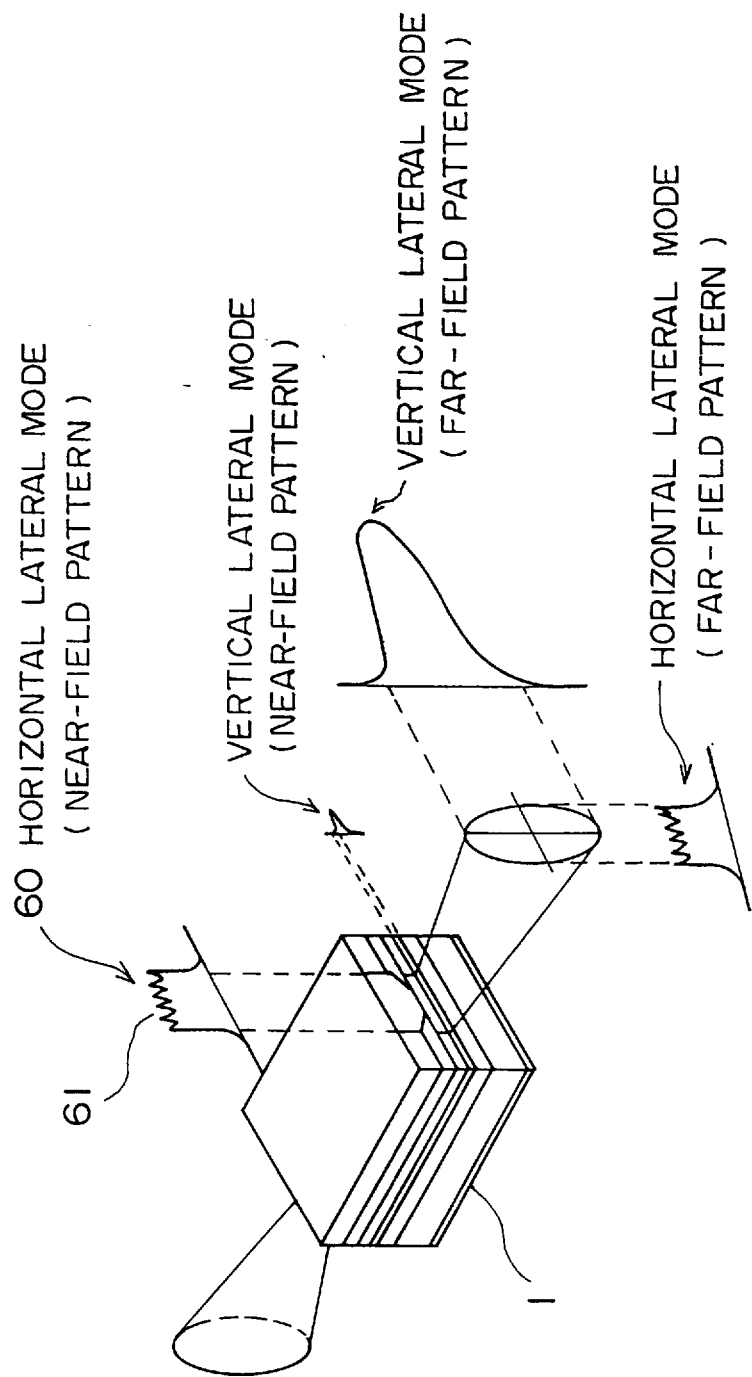
FIG. 18 is a diagram showing modes of a semiconductor laser diode.

FIG. 18 shows modes of the laser diode 1. As shown in FIG. 18, the laser diode 1 has a horizontal lateral mode 60 of the near-field pattern and a vertical lateral mode thereof. Further, the laser diode 1 has a horizontal lateral mode of a far-field pattern and a vertical lateral mode thereof. The horizontal lateral mode 60 of the near-field pattern has a saw-tooth-shaped wave portion 61.

Figure 19:
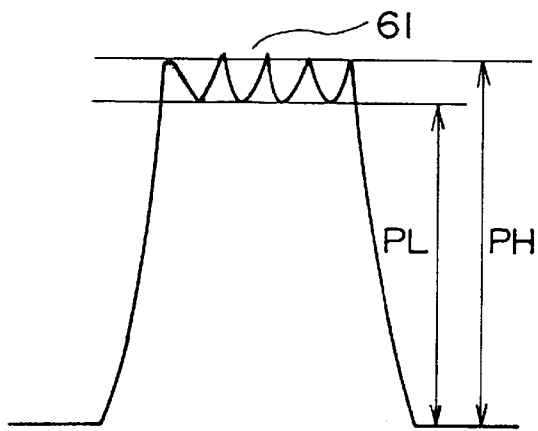
FIG. 19 is a graph showing the principle of the third embodiment of the present invention.

As shown in FIG. 19, a lower-end amplitude width PL of the horizontal lateral mode of the near-end pattern and an upper-end amplitude width PH thereof are defined. Then, the following relation is defined:

$$Ft(\%)=2(PH-PL)/(PH+PL)\times 100(\%)$$

where Ft is the degree of evenness of the intensity profile of the near-end pattern in the horizontal lateral mode. According to the third embodiment of the present invention, the laser diode 1 satisfies the following condition:

Ft<±10%

Typically, as the degree Ft of evenness of the intensity profile becomes smaller, the initialized state becomes better. However, since the laser diode 1 has the multimode, it is very difficult to eliminate the saw-tooth-shaped wave portion 61 in the horizontal lateral mode. Even if such a laser diode is realized, it will be very expensive. With the above in mind, a tolerable range of the degree Ft of evenness of the intensity profile is defined so that a tolerable variation in the reflection ratio of the initialized recording media can be obtained, according to the third embodiment of the present invention. The experimental results obtained when the laser diode 1 satisfying the above condition was used will be described later.

Figure 20:
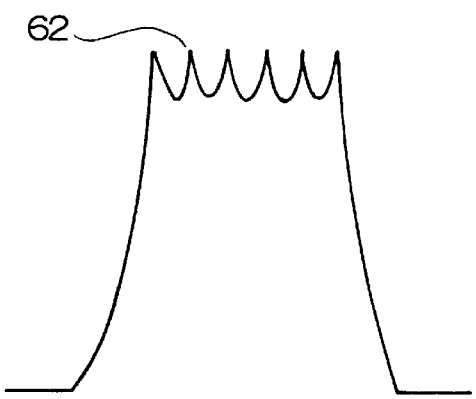
FIG. 20 is a graph of an intensity profile of a laser beam emitted from a semiconductor laser diode which can be used in the third embodiment of the present invention.
Figure 21:
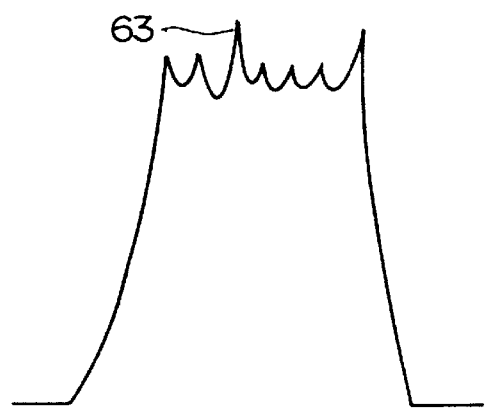
FIG. 21 is a graph of an intensity profile of a laser beam emitted from a semiconductor laser diode which is not suitable for the device shown in FIG. 17.

According to the third embodiment of the present invention, the laser diode 1 can be used which has an intensity profile as shown in FIG. 20, in which the intensity profile of the near-field pattern in the horizontal lateral mode has a periodic saw-tooth-shaped wave portion 62. The periodic wave portion of the intensity profile functions to even the initialized state of the recording layer 52. If the intensity profile of the laser diode 1 has a non-periodic saw-tooth wave portion 63 as shown in FIG. 21, it will be very difficult to obtain the evened initialized state.

(5) EXAMPLE (5)

The laser diode 1 which satisfies the above-mentioned condition was used in the device shown in FIG. 17. The laser diode 1 was used which has a stripe width of 200 $\mu m$ and a power of 1 W. The collimating lens 2 was used which has an NA of 0.5. The objective lens 4 was used which has an NA of 0.5. The layer structure of the recording media 5 used in example #5 was the same as that used in example #1. The power of the laser diode 1 was set to 850 mW. Each recording medium was driven at a linear velocity of 5 m/s and was transported at velocities of 20 $\mu m/r$, 30 $\mu/r$ and 40 $\mu/r$. As a comparative example, a high-power semiconductor laser diode having an intensity profile of the near-field pattern in the horizontal direction shown in FIG. 22 was used. The initializing condition in the comparative example was the same as that of example #1.

The recording media 5 thus subjected to the overwriting operation were evaluated by using a jitter of the 3T signal (intermark) respectively obtained when the overwriting process was repeatedly carried out 1000 times. In this case, the EFM random pattern was used as a recording signal and was repeatedly overwritten into the initialized recording media 5. In the overwriting operation, the recording power was 13 mW, the bias power was 5 mW, and the recording linear velocity was 2.8 m/s. The evaluated results are as shown in FIG. 22. It can be seen from FIG. 22 that the laser diode 1 that satisfies the condition can initialize the recording layer 52 very well.

(6) EXAMPLE #6

In example #6, the degree Ft of evenness of the intensity provide obtained on the recording layer 52 was measured. The initializing process was performed at the degrees Ft equal to ±3%, ±9%, ±12%, ±15% and ±20% obtained on the recording layer 52. The recording media 5 thus initialized were evaluated in the same manner as described previously. The degree Ft of evenness of the intensity profile can be changed by using the laser diodes having different degrees Ft of evenness of the intensity profile of the near-field pattern in the horizontal direction or by adjusting the optical system according to the first or second embodiment of the present invention.

In the initializing process of example #6, the linear velocity was 5.0 m/s, and the transporting velocity was 30 $\mu m/\tau$. The laser diode 1 having a power of 850 mW was used.

FIG. 23 shows the experimental results of example #6. It can be seen from FIG. 23 that the initialized state is degraded abruptly when the degree Ft of evenness of the intensity profile of the laser diode 1 in the horizontal lateral mode exceeds 10%. In other words, when the degree Ft of evenness obtained at the recording layer 52 is less than ±10% (Ft<±10%), the whole recording layer 52 can be evenly initialized.

(7) EXAMPLE #7

In example #7, the laser diode 1 was used which has an intensity profile including a periodic saw-tooth-shaped wave portion. In this case, the recording layer 52 can be evenly initialized even if the degree Ft of evenness of the intensity profile exceeds ±10%. In example #7, the power of the laser diode 1 was set to 850 mW. Each recording medium was driven at a linear velocity of 5 m/s and was transported at velocities of 20 $\mu$m/r, 30 $\mu$/r and 40 $\mu$/r.

FIG. 24 shows the experimental results in example #7. The laser diode 1 used had a degree Ft of evenness of the intensity profile equal to 13%. It can be seen from FIG. 24 that a good initialized state of the recording layer 52 can be obtained although the degree Ft of evenness is equal to 13%. This is due to the periodic saw-tooth-shaped wave portion of the intensity profile.

The present invention is not limited to the specifically disclosed embodiments, and variations and modifications may be made without departing from the scope of the present invention.

What is claimed is:

1. A device for initializing an optical recording medium comprising:

a semiconductor laser diode; and an optical system which projects a laser beam emitted from the semiconductor laser diode onto the optical recording medium, a half-value width of a spot of the laser beam focused on the optical recording medium being equal to ½ to ⅙ times a half-value width of a near-field pattern of the semiconductor laser diode in a direction parallel to a junction interface of the semiconductor laser diode, so that the optical recording medium can be evenly initialized by the laser beam.

2. The device as claimed in claim 1, wherein:

the semiconductor laser diode has a stripe width of approximately 200 $\mu$m; and the half-value width of the spot of the laser beam focused on the optical recording medium is equal to ⅓ to ⅙ times the half-value width of the near-field pattern of the semiconductor laser diode in the direction parallel to the junction interface of the semiconductor laser diode.

3. The device as claimed in claim 1, wherein:

the semiconductor laser diode has a stripe width of approximately 100 $\mu$m; and the half-value width of the spot of the laser beam focused on the optical recording medium is equal to ½ to ⅓ times the half-value width of the near-field pattern of the semiconductor laser diode in the direction parallel to the junction interface of the semiconductor laser diode.

4. The device as claimed in claim 1, wherein said optical system comprises:

a collimating lens collimating the laser beam emitted from the semiconductor laser diode;

an anamorphotic optical system enlarging a collimated beam from the collimating lens only in the direction parallel to the junction interface of the semiconductor laser diode; and an objective lens focusing an enlarged beam from the anamorphotic optical system on the optical recording medium.

5. A device for initializing an optical recording medium comprising:

a semiconductor laser diode; and an optical system which projects a laser beam emitted from the semiconductor laser diode onto the optical recording medium, said optical system including an adjustment part which adjusts a position of a focusing point of the laser beam with respect to the optical recording medium, the adjustment part adjusting the position of the focusing point of the laser beam so that the focusing point is located out of a recording layer of the optical recording medium, so that the recording layer can be evenly initialized by the laser beam.

6. The device as claimed in claim 5, wherein the adjustment part adjusts the position of the focusing point of the laser beam so as to be located within a distance of 1 $\mu$m to 3 $\mu$m at either side of the recording layer of the optical recording medium.

7. The device as claimed in claim 5, further comprising a monitor part which monitors a shape of the laser beam on the optical recording medium and an intensity profile thereof.

8. A device for initializing an optical recording medium comprising:

a semiconductor laser diode; and an optical system which projects a laser beam emitted from the semiconductor laser diode onto the optical recording medium, the laser beam having a degree of evenness of an intensity profile in a direction parallel to a junction interface of the semiconductor laser diode satisfying a given condition which enables a recording layer of the optical recording medium to be evenly initialized.

9. The device as claimed in claim 8, wherein:

the degree of evenness of the intensity profile of the laser beam is defined as:

$$Ft(\%)=2(PH-PL)/(PH+PL)\times100(\%)$$

where PH denotes a lower-end amplitude of the laser beam, PL denotes an upper-end amplitude thereof, and Ft denotes the degree of evenness of the intensity profile of the laser beam; and the degree Ft falls within a range of ±10%.

10. The device as claimed in claim 9, wherein the degree Ft falls within a range of ±10% on the recording layer of the optical recording medium.

11. The device as claimed in claim 10, wherein the laser beam has an intensity profile having a periodic wave portion in which the intensity of the laser beam has a periodical change in the direction parallel to the junction interface of the semiconductor laser diode.

12. A method for initializing an optical recording medium comprising the step of:

(a) projecting a laser beam emitted from a semiconductor laser diode onto the optical recording medium so that a half-value width of a spot of the laser beam focused on the optical recording medium is equal to ½ to ⅙ times a half-value width of a near-field pattern of the semiconductor laser diode in a direction parallel to a junction interface of the semiconductor laser diode, whereby the optical recording medium can be evenly initialized by the laser beam.

13. A method for initializing an optical recording medium comprising the step of:

(a) projecting a laser beam emitted from a semiconductor laser diode onto the optical recording medium so that a position of a focusing point of the laser beam is located out of a recording layer of the optical recording medium, whereby the recording layer can be evenly initialized by the laser beam.

14. The method as claimed in claim 13, wherein the step (a) comprises the step of adjusting the position of the focusing point of the laser beam so as to be located within a distance of 1 μm to 3 μm at either side of the recording layer of the optical recording medium.

15. A method for initializing an optical recording medium comprising the step of:

(a) projecting a laser beam emitted from a semiconductor laser diode onto the optical recording medium so that a degree of evenness of an intensity profile of the laser beam in a direction parallel to a junction interface of the semiconductor laser diode satisfies a given condition which enables a recording layer of the optical recording medium to be evenly initialized.

16. The method as claimed in claim 15, wherein:

the degree of evenness of the intensity profile of the laser beam is defined as:

$$Ft(\%) = 2(PH-PL)/(PH+PL) \times 100(\%)$$

where PH denotes a lower-end amplitude of the laser beam, PL denotes an upper-end amplitude thereof, and Ft denotes the degree of evenness of the intensity profile of the laser beam; and the degree Ft falls within a range of ±10%.

17. An optical recording medium comprising:

a base layer;

a first protection layer formed on the base layer;

a recording layer formed on the first protection layer; and a second protection layer, said recording layer having an initialized state obtained by projecting a laser beam emitted from a semiconductor laser diode onto the optical recording medium so that a half-value width of a spot of the laser beam focused on the optical recording medium is equal to ½ to ⅙ times a half-value width of a near-field pattern of the semiconductor laser diode in a direction parallel to a junction interface of the semiconductor laser diode, whereby the optical recording medium can be evenly initialized by the laser beam.

18. An optical recording medium comprising:

a base layer;

a first protection layer formed on the base layer;

a recording layer formed on the first protection layer; and a second protection layer, said recording layer having an initialized state obtained by projecting a laser beam emitted from a semiconductor laser diode onto the optical recording medium so that a position of a focusing point of the laser beam is located out of a recording layer of the optical recording medium, whereby the recording layer can be evenly initialized by the laser beam.

19. An optical recording medium comprising:

a base layer;

a first protection layer formed on the base layer;

a recording layer formed on the first protection layer; and a second protection layer, said recording layer having an initialized state obtained by projecting a laser beam emitted from a semiconductor laser diode onto the optical recording medium so that a degree of evenness of an intensity profile of the laser beam in a direction parallel to a junction interface of the semiconductor laser diode satisfies a given condition which enables a recording layer of the optical recording medium to be evenly initialized.

* * * * *